(12) United States Patent
Xie et al.

(10) Patent No.: US 10,599,277 B2
(45) Date of Patent: Mar. 24, 2020

(54) TOUCH PANEL AND DISPLAY DEVICE

(71) Applicant: SHANGHAI TIANMA MICRO-ELECTRONICS CO., LTD., Shanghai (CN)

(72) Inventors: Liang Xie, Shanghai (CN); Hong Ding, Shanghai (CN); Kang Yang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 203 days.

(21) Appl. No.: 15/787,714

(22) Filed: Oct. 19, 2017

(65) Prior Publication Data

US 2018/0039358 A1 Feb. 8, 2018

(30) Foreign Application Priority Data

Jun. 27, 2017 (CN) .......................... 2017 1 0502122

(51) Int. Cl.
*G06F 3/044* (2006.01)
*G06F 3/041* (2006.01)

(52) U.S. Cl.
CPC ............ *G06F 3/0448* (2019.05); *G06F 3/044* (2013.01); *G06F 3/0412* (2013.01); *G06F 3/0443* (2019.05); *G06F 3/0446* (2019.05); *G06F 2203/04103* (2013.01); *G06F 2203/04111* (2013.01); *G06F 2203/04112* (2013.01)

(58) Field of Classification Search
CPC ...... G06F 3/044; G06F 3/0443; G06F 3/0446; G06F 3/0448; G06F 2203/04103; G06F 2203/04107; G06F 2203/04111–041133; G06F 3/0412
See application file for complete search history.

(56) References Cited

U.S. PATENT DOCUMENTS

2014/0313437 A1* 10/2014 Huang ..................... G06F 3/041
349/12
2015/0009422 A1* 1/2015 Tung ....................... G06F 3/044
349/12
2016/0195984 A1* 7/2016 Bok ......................... G06F 3/044
345/173

(Continued)

FOREIGN PATENT DOCUMENTS

CN 105183251 A 12/2015
CN 106462307 A 2/2017

OTHER PUBLICATIONS

Office Action of Chinese Patent Application No. 201710502122.4 dated Oct. 21, 2019.

*Primary Examiner* — David Tung
(74) *Attorney, Agent, or Firm* — Kilpatrick Townsend & Stockton, LLP

(57) ABSTRACT

The present application discloses a touch panel and a display device. The touch panel includes first touch electrodes arranged in a first direction and second touch electrodes arranged in a second direction in a touch area of a substrate, first touch electrode lines and second touch electrode lines, and the first touch electrode lines are at least partially arranged in a touch area, the first touch electrode and/or the second touch electrode has an opening area, and an orthographic projection of the first touch electrode line to the substrate overlaps with that of the opening area to the substrate.

7 Claims, 14 Drawing Sheets

(56) References Cited

U.S. PATENT DOCUMENTS

2016/0378240 A1* 12/2016 Li .................... G06F 3/0412
  345/174
2018/0046287 A1*  2/2018 Wada .................... B32B 7/02
2018/0348902 A1* 12/2018 Zhang ................ G06F 3/044

* cited by examiner

TOUCH PANEL AND DISPLAY DEVICE

CROSS-REFERENCE TO RELATED APPLICATION

This application is related to and claims priority from Chinese Patent Application No. 201710502122.4, filed on Jun. 27, 2017, entitled "Touch Panel and Display Device," the entire disclosure of which is hereby incorporated by reference for all purposes.

TECHNICAL FIELD

The present application generally relates to the technical field of display, particularly to a touch panel and a display device.

BACKGROUND

With the development of touch technology, capacitive touch devices have been widely used in mobile phones, tablet computers, computer displays, digital cameras and other electronic devices. In accordance with detection modes, the capacitive touch devices can be divided into self-capacitance touch devices and mutual-capacitance touch devices.

In a mutual-capacitance touch device, a touch function is mainly realized by two touch electrode layers (for example, a touch driving electrode layer and a touch sensing electrode layer), each touch electrode layer has a plurality of parallel touch electrodes, and the extension directions of two layers of touch electrodes intersect. A touch excitation signal is applied to the touch electrodes (touch driving electrodes) on one touch electrode layer, and when a finger contacts a screen of the touch device, the finger and certain touch electrodes on the screen form a coupling capacitor, and a leakage current flows out of the coupling capacitor. A touch sensing circuit determines two intersecting touch electrodes forming the coupling capacitor with the finger on the two touch electrode layers by detecting the leakage current so as to determine a touch position.

FIG. 1 shows a schematic diagram of a touch device in the prior art. As shown in FIG. 1, the touch device includes a plurality of touch sensing electrodes RE arranged in a first direction D1, a plurality of touch driving electrodes TE arranged in a second direction D2, a plurality of touch sensing electrode lines RL, a plurality of touch driving electrode lines TL and a driving circuit IC, the touch driving electrodes TE are connected to the driving circuit IC through the touch driving electrode lines TL, and the touch sensing electrodes RE are connected to the driving circuit IC through the touch sensing electrode lines RL. In one embodiment, the first direction D1 and the second direction D2 intersect.

Because the touch sensing electrodes RE extend in the second direction D2, the touch sensing electrode lines RL need wiring in a frame area on two sides of the touch device, in other words, the frame area with a certain width (e.g., hundreds of microns) needs to be reserved on the two sides of the touch device for wiring, resulting in that the frame on two sides of the touch device is widened, which is not favorable for the realization of a narrow frame.

SUMMARY

In view of the above defects or shortcomings in the prior art, a touch panel and a display device are expected to be provided to solve the technical problems in the prior art.

According to one aspect of the present application, a touch panel is provided and includes: a substrate including a touch area and a peripheral area outside the touch area, the touch area is provided with a plurality of first touch electrodes arranged in a first direction and a plurality of second touch electrodes arranged in a second direction; the first touch electrode includes a plurality of first touch electrode blocks arranged in the second direction, the second touch electrode includes a plurality of second touch electrode blocks arranged in the first direction, and the first direction and the second direction intersect; and a plurality of first touch electrode lines and a plurality of second touch electrode lines, the first touch electrode line is used for transmitting a first touch signal to the first touch electrode, the second touch electrode line is used for transmitting a second touch signal to the second touch electrode, and the first touch electrode line is at least partially arranged in the touch area. The first touch electrode and/or the second touch electrode is provided with an opening area; and an orthographic projection of the first touch electrode line to the substrate overlaps with that of the opening area to the substrate.

According to another aspect of the present application, a display device is further provided, including the touch panel as described above.

According to the touch panel and the display device provided by the present application, by setting the opening area in the first touch electrode and/or the second touch electrode, and setting the first touch electrode line in the touch area at least partially, a frame area on two sides of the touch panel is reduced to facilitate implementation of a narrow frame; meanwhile, the orthographic projection of the first touch electrode line to the substrate overlaps with that of the opening area to the substrate, so that the parasitic capacitance between the first touch electrode line and the first touch electrode and/or the second touch electrode is reduced.

BRIEF DESCRIPTION OF THE DRAWINGS

Other features, objectives and advantages of the present application will become more apparent by reading a detailed description of the non-restrictive embodiments made with reference to the following drawings.

DETAILED DESCRIPTION OF EMBODIMENTS

The present application will be further described below in detail in combination with the accompanying drawings and the embodiments. It should be appreciated that the some embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
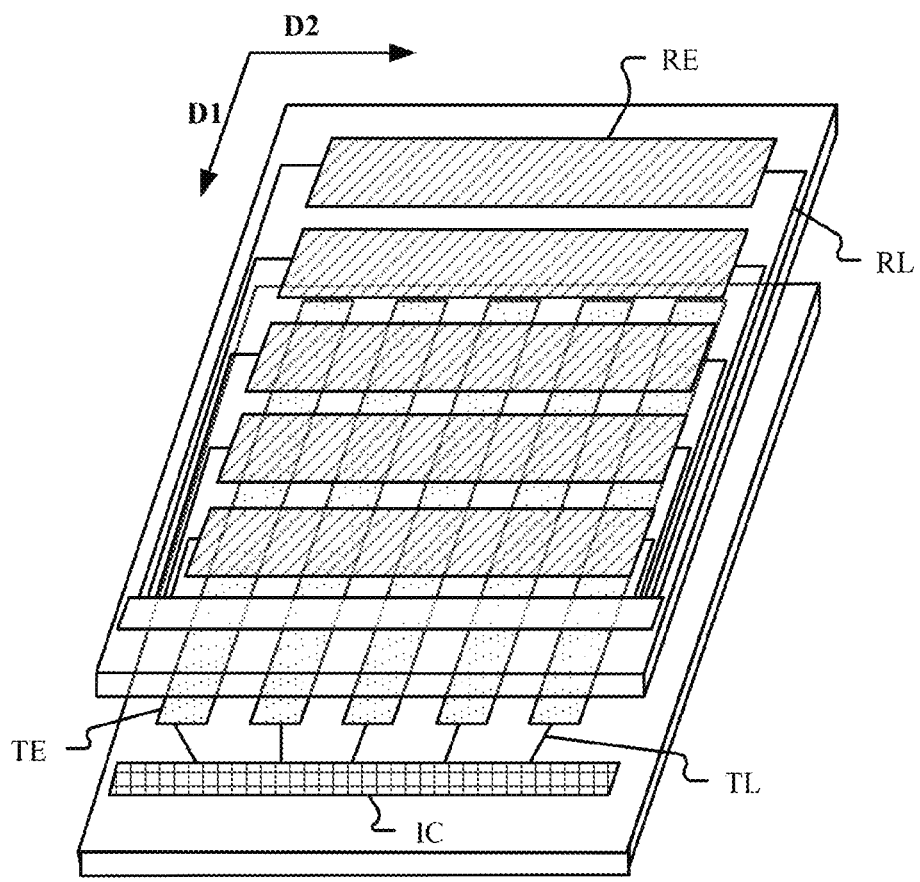
FIG. 1 shows a schematic diagram of a touch device in the prior art.
Figure 2A:
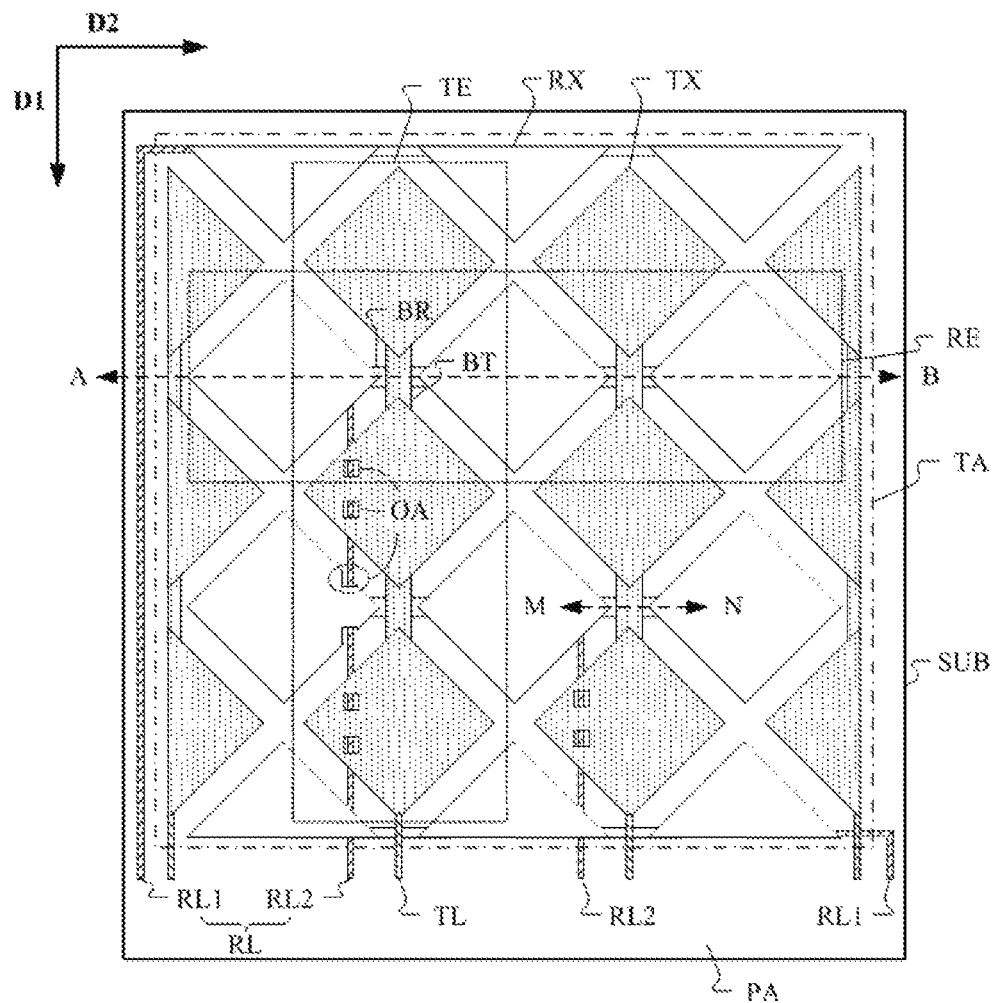
FIG. 2A shows a schematic diagram of the touch panel in one embodiment of the present application.

FIG. 2A shows a schematic diagram of the touch panel in one embodiment of the present application.

As shown in FIG. 2A, the touch panel may include a substrate SUB, a plurality of first touch electrode lines RL and a plurality of second touch electrode lines TL. In one embodiment, the substrate SUB may include a touch area TA and a peripheral area PA outside the touch area TA, and a driving circuit (not shown) may be arranged in the peripheral area PA.

The touch area TA may be provided with a plurality of first touch electrodes RE arranged in a first direction D1 and a plurality of second touch electrodes TE arranged in a second direction D2, the first touch electrode RE may include a plurality of first touch electrode blocks RX arranged in the second direction D2, the second touch electrode TE mat include a plurality of second touch electrode blocks TX arranged in the first direction D1. In one embodiment, a plurality of second touch electrode blocks TX may be arranged between adjacent two first touch electrodes RE, and a plurality of first touch electrode block RX may be arranged between adjacent two second touch electrodes TE. Here, the first direction D1 and the second direction D2 intersect.

The first touch electrode line RL may be used for transmitting a first touch signal to the first touch electrode RE, the second touch electrode line TL may be used for transmitting a second touch signal to the second touch electrode TE, and the first touch electrode line RL is at least partially arranged in the touch area TA. In one embodiment, in the first touch electrode lines RL, at least one first touch electrode line RL2 extends from the touch area TA to the peripheral area PA in the first direction D1, and the rest first touch electrode lines RL1 may be connected to the driving circuit in the peripheral area PA through the frame area on two sides of the touch panel.

In this way, the number of the first touch electrode lines RL1 arranged in the frame on the two sides of the touch panel is reduced, thereby reducing the area occupied by the frame on the two sides, and facilitating implementation of a narrow frame.

Moreover, the first touch electrode RE and/or the second touch electrode TE is provided with an opening area OA, and the orthographic projection of the first touch electrode line RL2 to the substrate SUB overlaps with that of the opening area OA to the substrate SUB. By setting the opening area OA, the overlapping area between the first touch electrode line RL2 and the first touch electrode RE and/or the second touch electrode TE is reduced (i.e., the parasitic capacitance is reduced), so that touch detection is more accurate.

In the present embodiment, by setting the opening area in the first touch electrode and/or the second touch electrode, and setting the first touch electrode line in the touch area at least partially, the frame area on the two sides of the touch panel is reduced to facilitate the implementation of a narrow frame. In addition, the orthographic projection of the first touch electrode line to the substrate overlaps with that of the opening area to the substrate, thereby reducing the parasitic capacitance between the first touch electrode line and the first touch electrode and/or the second touch electrode.

Figure 2B:
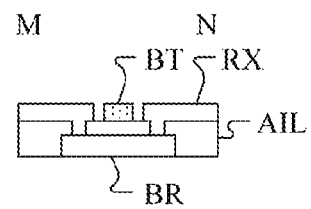
FIG. 2B is a sectional view cut along a line MN shown in FIG. 2A.

The first touch electrode blocks RX in each first touch electrode RE are electrically connected with one another, the second touch electrode blocks TX in each second touch electrode TE are electrically connected with one another, and FIG. 2B shows a schematic structure diagram of implementation of this type of electric connection.

As shown in FIG. 2B, the touch panel further includes a plurality of first connecting parts BR, a plurality of second connecting parts BT, and an auxiliary insulating layer AIL between the first connecting part BR and the second connecting part BT. In one embodiment, the first touch electrode blocks RX in each first touch electrode RE are electrically connected through the first connecting parts BR, the second touch electrode blocks TX in each second touch electrode TE are electrically connected through the second connecting parts BT, and the second connecting parts BT and the second touch electrode blocks TX are in an identical conductor layer.

In some optional implementations of the present embodiment, the first touch electrode line RL2 may be arranged in an area between adjacent two second connecting parts TB in the second direction D2.

Figure 2C:
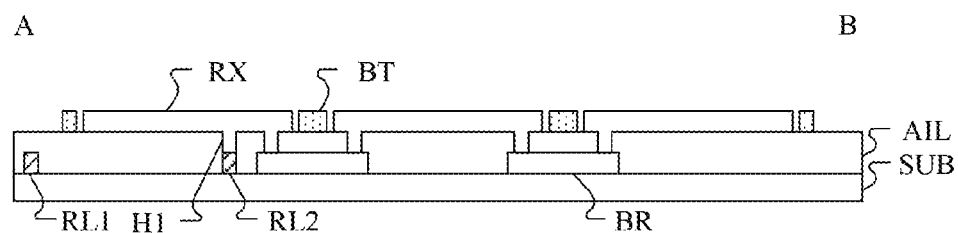
FIG. 2C is a sectional view cut along a line AB shown in FIG. 2A.

As shown in FIG. 2A and FIG. 2C, the second touch electrode line TL and the second touch electrode block TX may be in an identical conductor layer, the first touch electrode line RL and the first connecting part BR may be in an identical conductor layer and separated from each other, and the first touch electrode block and/or the second touch electrode block may be provided with at least one first opening OA. In one embodiment, the orthographic projection of the first touch electrode line RL2 to the substrate SUB overlaps with that of at least one first opening OA to the substrate SUB.

The first touch electrode line RL2 may be arranged between adjacent two second touch electrodes TE, the second touch electrode line RL2 may intersect with the first touch electrode block RX and the second touch electrode block TX, and because the first opening OA is formed in an area where the second touch electrode line RL2 intersects with the first touch electrode block RX and the second touch electrode block TX, the area of an overlapping area may be reduced (e.g., by 30%, 50%, etc.), and then the influence caused by signal changes of the second touch electrode line RL2 on the mutual capacitance between the first touch electrode RE and the second touch electrode TE is reduced to ensure that touch sensing is more accurate.

The first opening OA may be a closed opening, for example, a first opening OA formed in the first touch electrode block RX and/or the second touch electrode block TX; and the first opening also may be an unclosed opening, for example, a first opening OA formed in an edge of the first touch electrode block RX and/or the second touch electrode block TX.

Since the first touch electrode line RL and the first touch electrode RE are in different conductor layers and the first touch electrode line RL and the first connecting part BR are separated from each other, the first touch electrode line RL may be electrically connected with the first touch electrode RE through a contact hole.

Optionally, a first contact hole H1 is formed in the auxiliary insulating layer AIL, and the first touch electrode line RL is electrically connected with the first touch electrode block RX in the first touch electrode RE through the first contact hole H1.

In addition, because the first connecting part BR is electrically connected with first touch electrode blocks RX in the first touch electrode RE, the first touch electrode line RL may also be electrically connected with the first connecting part BR through a connecting electrode in an identical conductor layer.

Optionally, the touch panel includes a connecting electrode in an identical layer with the first connecting part BR, and the first touch electrode line RL is electrically connected with the first connecting part BR through the connecting electrode.

It can be seen from the above that by setting the first touch electrode line RL2 in an area between adjacent two second connecting parts in the second direction D2, the frame area on the two sides of the touch panel is reduced.

Or, in some other optional implementations of the present embodiment, the first touch electrode line RL2 may be arranged in the second touch electrode.

Figure 3A:
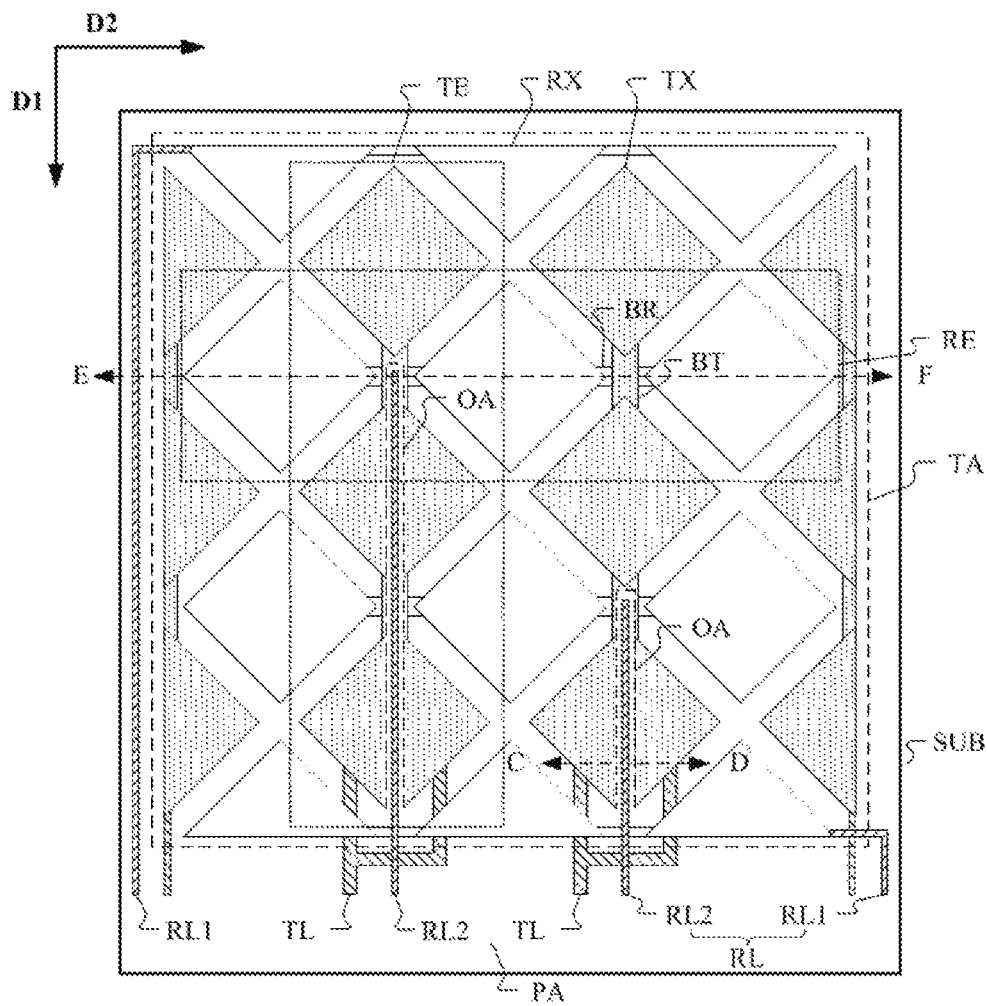
FIG. 3A shows a schematic diagram of an optional implementation in the embodiment shown in FIG. 2A.
Figure 3B:
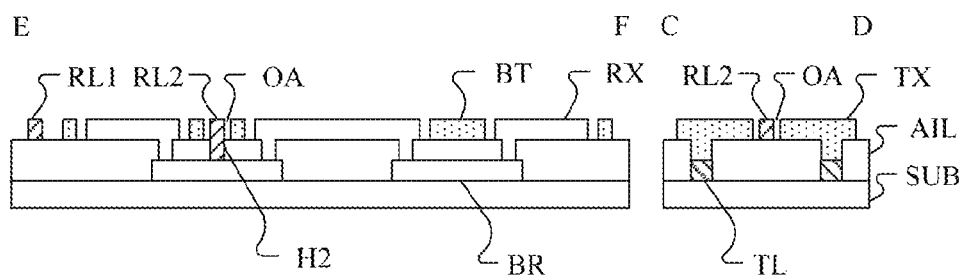
FIG. 3B is a sectional view cut along a line CD and a line EF shown in FIG. 3A.

As shown in FIG. 3A and FIG. 3B, the second touch electrode block TX and the first touch electrode line RL may be in an identical conductor layer and are insulated from each other. The touch panel may further include a plurality of line openings OA in the second touch electrode TE and extending in the first direction D1, and the first touch electrode line RL2 may be arranged in the line opening. A line TL of the second touch electrode and the first connecting part BR may be in an identical conductor layer and are insulated from each other.

The first touch electrode line RL2 is in the line opening OA in the second touch electrode TE (and the second connecting part BT), and does not overlap with the first touch electrode RE and the second touch electrode TE, so that the signal changes on the first touch electrode line RL2 will not influence the mutual capacitance between the first touch electrode RE and the second touch electrode TE to ensure that the touch sensing is more accurate.

Since the second touch electrode block TX or the second connecting part BT is spaced between the first touch electrode line RL2 and the first touch electrode block RX, the first touch electrode line RL2 may be electrically connected with the first connecting part BR through a contact hole.

In one embodiment, the auxiliary insulating layer AIL is provided with a second contact hole H2, and the first touch electrode line RL2 is electrically connected with the first connecting part BR through the second contact hole H2.

It should be noted that for the first touch electrode line RL1, because the first touch electrode line RL1 is not in the line opening OA, the first touch electrode line RL1 may be electrically connected with the first touch electrode block RX directly.

In addition, since the second touch electrode line TL and the second touch electrode TE are in different conductor layers, the second touch electrode line TL may be electrically connected with the second touch electrode block TX in the second touch electrode TE through a contact hole.

Although FIG. 3A shows that each line opening OA occupies a different area in the second touch electrode TE (and the second connecting part BT), this is only schematic. It should be understood that each line opening OA may be designed with an identical size to ensure that the areas except the line opening OA in each second touch electrode TE have a basically identical resistance value.

Although FIG. 3A shows that the line opening OA is arranged in part of the second touch electrodes TE, but the present embodiment is not limited to this. It should be understood that, the line opening OA may be arranged in all the second touch electrodes TE, depending on specific needs. For example, when the number of the first touch electrodes RE is smaller than that of the second touch electrodes TE, the line opening OA may be arranged in part of the second touch electrodes TE; and when the number of the first touch electrodes RE is more than or equal to that of the second touch electrodes TE, the line opening OA may be arranged in all the second touch electrodes TE.

In addition, although FIG. 3A shows that one first touch electrode line RL2 is arranged in each line opening OA, the present embodiment is not limited to this, and it should be understood that each line opening may be provided with no first touch electrode line RL2 or with a plurality of first touch electrode lines RL2, depending on a numerical relationship between the first touch electrodes RE and the second touch electrodes TE.

In addition, although FIG. 3A shows that the line opening OA divides part of the second touch electrode blocks TX in the second touch electrode TE into two separated parts, this is only schematic. It should be appreciated by those skilled in the art that, the line opening OA may divide all the second touch electrode blocks TX (and all the second connecting parts BT connected with the second touch electrode TE) in the second touch electrode TE into two parts separated from each other.

Optionally, the two parts, separated by the line opening OA, of the second touch electrode block TX (and the second connecting part BT) are electrically connected with an identical second touch electrode line TL. In this way, although the second touch electrode TE is divided into two parts separated from each other by the line opening OA, the separated two parts still may be regarded as an identical second touch electrode TE for touch sensing.

It can be seen from the above that by setting the line opening OA in the second touch electrode TE (and the second connecting part BT), the frame area on the two sides of the touch panel is reduced.

Although FIG. 2A and FIG. 3A show that the first touch electrode line RL includes the first touch electrode line RL1 (arranged in the frame on the two sides of the touch panel) and the first touch electrode line RL2 (extending from the touch area TA to the peripheral area PA in the first direction D1), the present application is not limited to this. Those skilled in the art may understand that as long as the first touch electrode line RL2 is included in the first touch electrode line RL, the frame area on the two sides of the touch panel may be reduced, and the greater the number of the included first touch electrode lines RL2 is, the smaller the frame area on the two sides of the touch panel is.

In one embodiment, all the first touch electrode lines RL are arranged in the touch area TA.

In other words, all the first touch electrode lines RL extend from the touch area TA to the peripheral area PA in the first direction D1, i.e., the first touch electrode line RL has no first touch electrode line RL1.

Therefore, the frame on the two sides of the touch panel does not need to be provided with the first touch electrode line RL1 or the touch panel does not need to be provided with the frame on the two sides (only needs to keep the frame on one side of the peripheral area PA), so that a narrow frame or no frame on the two sides of the touch panel may be implemented.

Figure 4:
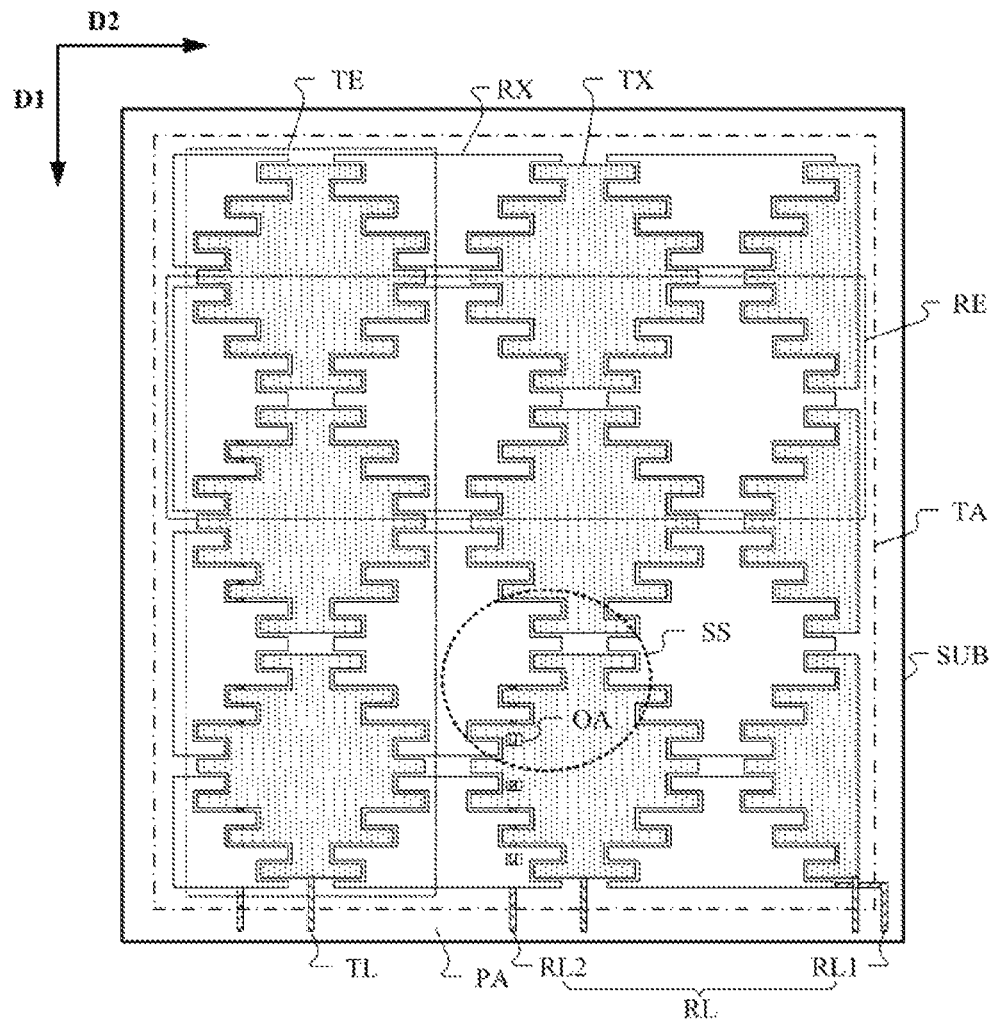
FIG. 4 shows a schematic diagram of the touch panel in another embodiment of the present application.
Figure 5:
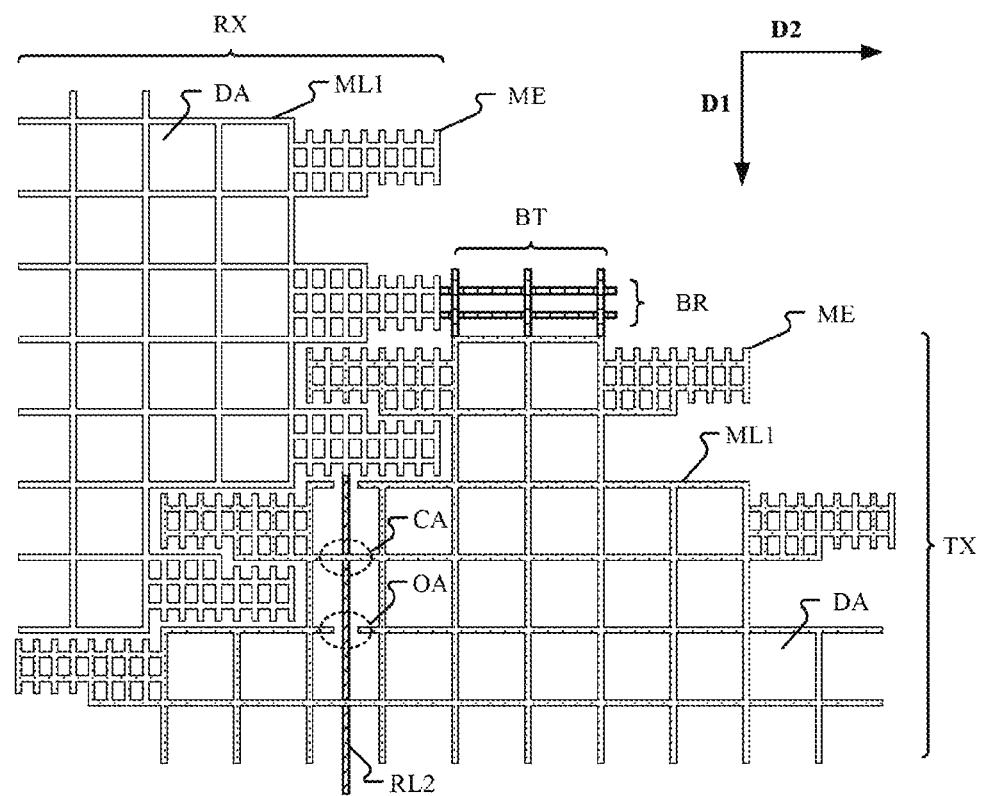
FIG. 5 is a partial enlarged drawing of an area SS shown in FIG. 4.

Continue to refer to FIG. 4 and FIG. 5, FIG. 4 shows a schematic diagram of the touch panel in another embodiment of the present application, and FIG. 5 shows a schematic diagram of local amplification of an area SS shown in FIG. 4.

Similar to the embodiment shown in FIG. 2A, in the present embodiment, the touch panel also may include a plurality of first touch electrodes RE, a plurality of second touch electrodes TE, a plurality of first touch electrode lines RL and a plurality of second touch electrode lines TL, the first touch electrode RE also may include a plurality of first touch electrode blocks RX, the second touch electrode TE also may include a plurality of second touch electrode blocks TX, and the first touch electrode line RL also may be at least partially arranged in the touch area TA (i.e., there is at least one first touch electrode line RL2 extending from the touch area TA to the peripheral area PA in the first direction D1).

Unlike the touch panel shown in FIG. 2, the present embodiment further defines the first touch electrode block RX and the second touch electrode block TX.

In one embodiment, as shown in FIG. 5, the first touch electrode block RX and the second touch electrode block TX include a metal grid formed by intersecting metal lines.

The area where the first touch electrode line RL2 overlaps with the first touch electrode block RX or the second touch electrode block TX is provided with at least one opening area OA, and the metal lines for forming the metal grid are not arranged in the opening area OA. Meanwhile, in order to ensure that the parts, which are positioned on two sides of the first touch electrode line RL2, of the first touch electrode block RX or the second touch electrode block TX are electrically connected with each other, at least one intersection area CA is arranged in the overlapping area, and the first touch electrode line RL2 are in insulating intersection with the metal lines forming the metal grid.

In the present embodiment, by setting the opening area in the first touch electrode and/or the second touch electrode, and setting the first touch electrode line in the touch area at least partially, the frame area of the touch panel is reduced.

Because the metal lines are poor in light transmission, the metal lines may be arranged among subpixels of the touch panel to prevent the metal grid from influencing the display of the touch panel.

Optionally, the touch panel further includes a pixel array consisting of a plurality of subpixels, and the metal lines forming the metal grid are arranged in pixel separation areas among the subpixels.

By setting the opening area OA, the influence of the first touch electrode line RL2 on the mutual capacitance between the first touch electrode and the second touch electrode is reduced, and the beneficial effect will be further illustrated through experimental data hereinafter.

Because the overlapping area between the first touch electrode line RL2 and the second touch electrode TE is large, taking that the line width (in the second direction D2) of the first touch electrode line RL2 is 3 μm, the length (in the first direction D1) of the overlapping area between the first touch electrode line RL2 and the second touch electrode block TX is 20 μm, the auxiliary insulating layer between the first connecting part BR and the second connecting part BT is silicon nitride with a thickness of 3000 Å (in a direction perpendicular to the touch panel), and the first touch electrode line RL2 overlaps with 20 second touch electrode blocks TX (in an identical second touch electrode TE) as an example, when the opening area OA is not provided, according to a formula:

$$C = \frac{\varepsilon \cdot S}{d}, \quad (1)$$

C represents the capacitance between the first touch electrode line RL2 and the second touch electrode TE, ε represents a dielectric constant, S represents a facing area between the first touch electrode line RL2 and the second touch electrode TE, and d represents a distance between the first touch electrode line RL2 and the second touch electrode TE.

It can be calculated that the parasitic capacitance between the first touch electrode line RL2 and the second touch electrode TE is about 210 fF, but usually, the parasitic capacitance between the first touch electrode RE and the second touch electrode TE is designed to be 1 pF to 2 pF. In other words, the parasitic capacitance between the first touch electrode line RL2 and the second touch electrode TE is about 10-20% of the mutual capacitance, namely the parasitic capacitance influences the accuracy of touch detection to a certain extent.

However, in the present embodiment, the overlapping area between the first touch electrode line RL2 and the second touch electrode TE is reduced with the increase of the number of the opening areas OA, and taking that the opening areas OA occupy 50% of the overlapping area as an example, the parasitic capacitance between the first touch electrode line RL2 and the second touch electrode TE may be reduced to about 105 fF, equivalent to only 5-10% of the mutual capacitance, which reduces the interference of the parasitic capacitance to the mutual capacitance.

Thus, the parasitic capacitance is reduced by adjusting the number of the opening areas OA, and the accuracy of touch detection may be improved.

Figure 6:
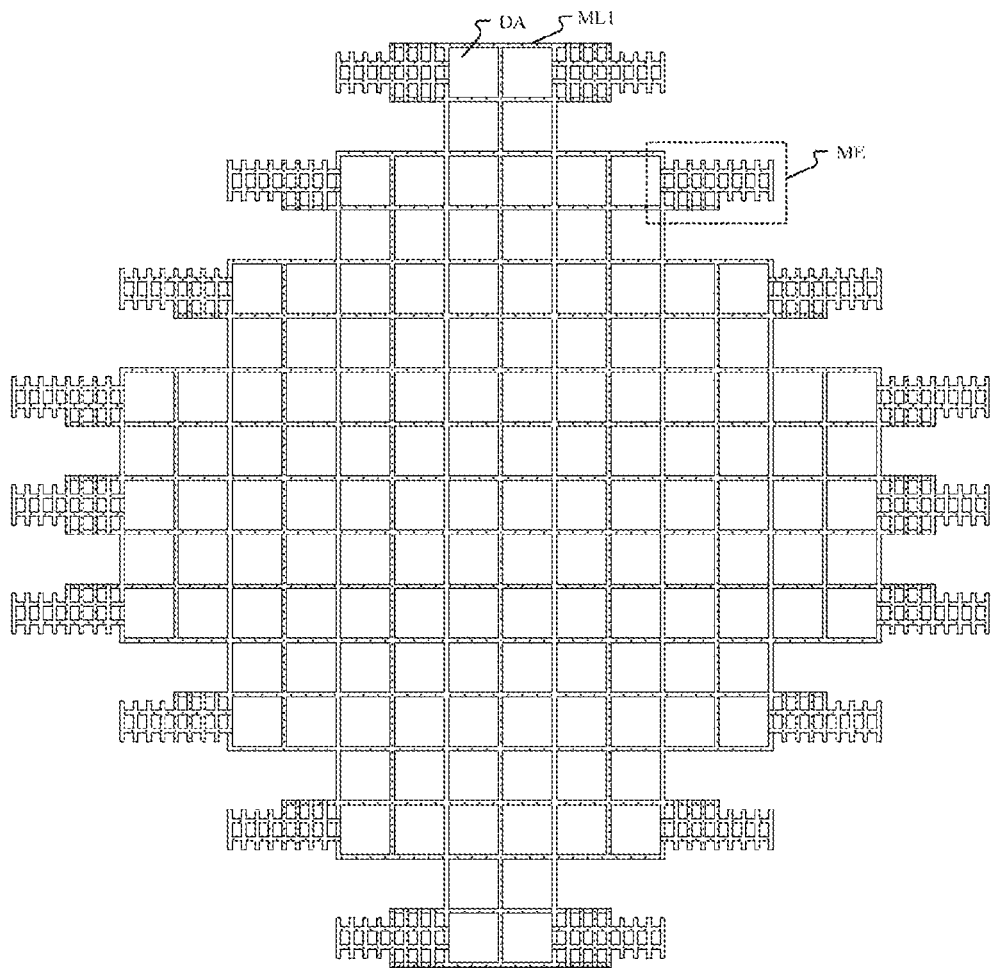
FIG. 6 shows a schematic diagram of the touch electrode in the embodiment shown in FIG. 4.

In the present embodiment, the first touch electrode block RX and the second touch electrode block TX may adopt an identical structural design, as shown in FIG. 6.

Optionally, the first touch electrode block RX and the second touch electrode block TX may include a plurality of sensing parts ME electrically connected through a plurality of first metal connecting lines ML1 which intersect to form a plurality of reserved areas DA.

The sensing parts ME are positioned at the edges of the first touch electrode block RX and the second touch electrode block TX and used for forming mutual capacitance between the first touch electrode block RX and the second touch electrode TX.

Optionally, the sensing part includes a metal grid formed by intersecting metal lines around subpixels.

In other words, the sensing part ME may also include the metal grid formed by intersecting the metal lines, and the metal grid of the sensing part ME has a higher density (compared with the metal grid of the first touch electrode block RX and the second touch electrode block TX), for example, it may be formed by intersecting the metal lines around the subpixels.

Figure 7:
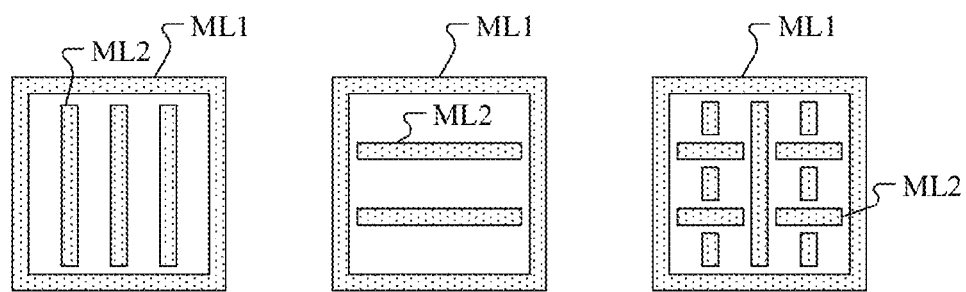
FIG. 7 shows a schematic structure diagram of a reserved area of the touch electrode block shown in FIG. 6.

Although FIG. 5 and FIG. 6 show that the reserved area DA is a blank area, it is only schematic. It should be appreciated that the reserved area may include a plurality of second metal lines ML2, as shown in FIG. 7. In one embodiment, the first metal connecting line ML1 and the second metal line ML2 are electrically insulated from each other.

FIG. 7 schematically shows three types of arrangement of the second metal line ML2, but the present embodiment is not limited to this. The second metal line ML2 may be designed into any appropriate arrangement as long as it is in areas among the subpixels.

Optionally, the first touch electrode line and the second touch electrode line may include a wire layout formed by a metal, and may also be arranged in the areas among the subpixels.

Although FIG. 4 and FIG. 5 show that the first touch electrode line RL2 is a straight line, the present embodiment is not limited to this. It should be understood that the shape of the first touch electrode line RL2 depends on an arrangement mode of pixels, for example, when the subpixels of the touch panel are arranged in an inverted T shape, the first touch electrode line RL2 may be a metal fold line.

Optionally, the first touch electrode line may include at least one first sub touch electrode line, and the second touch electrode line may include at least one second sub touch electrode line. In one implementation of the embodiment of the present application, the first sub touch electrode line and/or the second sub touch electrode line are metal lines, for example, the first sub touch electrode line may be a straight line or fold line shaped metal line in the areas among the subpixels, and the second sub touch electrode line may be a metal line in the peripheral area, but the present application is not limited to this and can be set according to actual situations specifically.

Under the condition that the first touch electrode line RL1/RL2 includes one first sub touch electrode line, when the first touch electrode line RL1/RL2 is disconnected, the first touch electrode RE electrically connected with the first touch electrode line RL1/RL2 may not work normally (for example, receiving or sensing touch signals); however, when the first touch electrode line RL1/RL2 include a plurality of first sub touch electrode lines, the first touch electrode line RL1/RL2 has a much smaller probability of disconnection, thereby improving the reliability of electrical connection of the first touch electrode RE. Similarly, when the second touch electrode line TL includes a plurality of first touch electrode lines, the reliability of electric connection of the second touch electrodes TE may be improved so as to improve the reliability of the touch panel.

Although FIG. 4 and FIG. 5 show that the first touch electrode line RL2 is arranged in the area between adjacent two second connecting parts TB in the second direction D2, the present embodiment is not limited to this.

Figure 8:
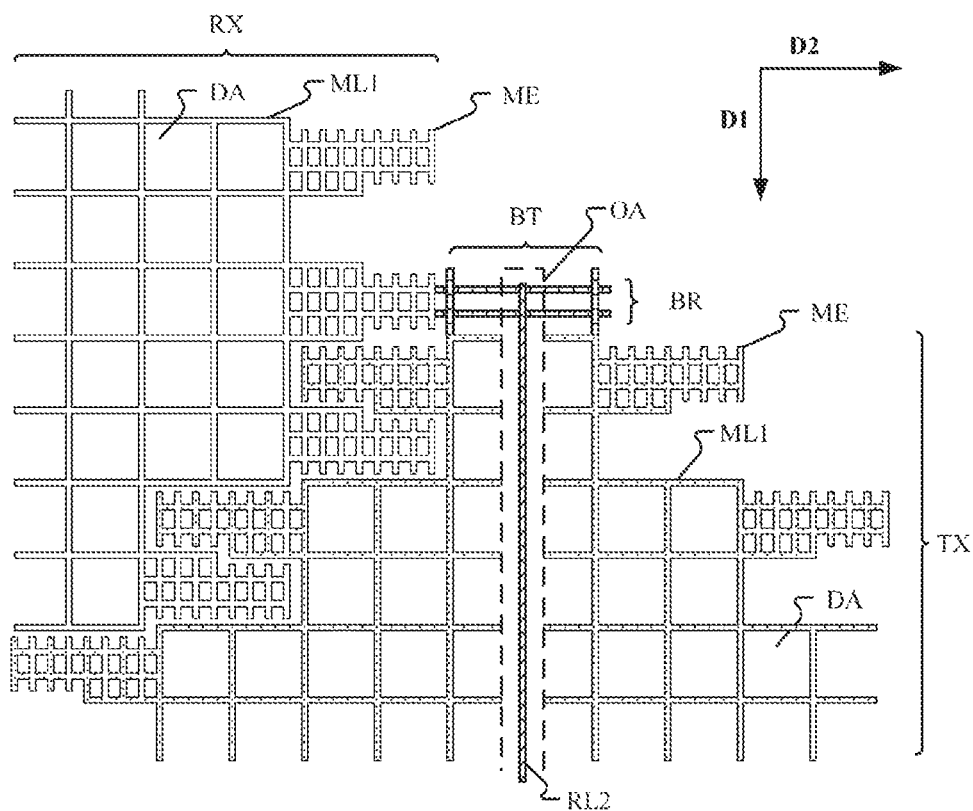
FIG. 8 shows a schematic diagram of an optional implementation in the embodiment shown in FIG. 4.

Optionally, the first touch electrode line RL2 may also be the second touch electrode TE (and the second connecting part BT), as shown in FIG. 8.

In FIG. 8, a line opening OA extending in the first direction D1 is formed in the second touch electrode, the first touch electrode line RL2 is arranged in the line opening OA, the first touch electrode line RL2 and the second touch electrode are in an identical layer and are insulated from each other, and the first touch electrode line RL2 is electrically connected with the first connecting part BR through a second contact hole (not shown).

In this example, because the first touch electrode line RL2 does not overlap with the first touch electrode and the second touch electrode, the first touch electrode line RL2 and the first touch electrode or the second touch electrode do not generate parasitic capacitance in a direction perpendicular to the touch panel.

In the section direction, a first touch signal line RL2 and the second touch electrode may generate transverse capacitance, but because the first touch signal line RL2 and the second touch electrode are spaced for at least one subpixel (tens of μm, e.g., 32 μm, equivalent to about 100 times the thickness of the auxiliary insulating layer), and the film thickness (similar to the auxiliary insulating layer, about 3000 Å) of the first touch signal line RL2 is only equivalent to about one-tenth of the line width (e.g., 3 μm) thereof, compared with the mutual capacitance, the transverse capacitance value is very small and may be negligible.

In other words, the signal changes on the first touch electrode line RL2 will not influence the mutual capacitance between the first touch electrode and the second touch electrode.

Figure 9:
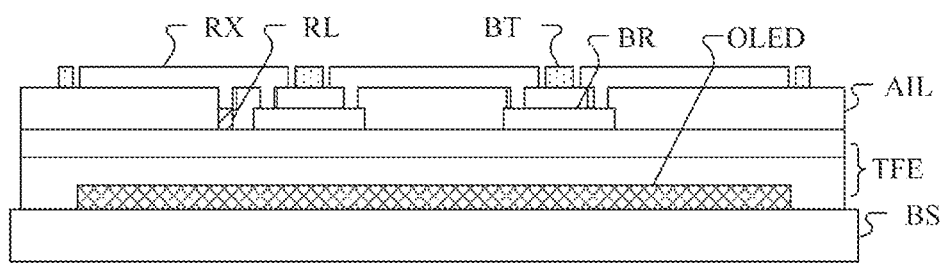
FIG. 9 shows a schematic structure diagram of the touch panel in another embodiment of the present application.

Continue to refer to FIG. 9, it shows a schematic structure diagram of the touch panel in another embodiment of the present application.

Similar to the embodiment shown in FIG. 2A, in the present embodiment, the touch panel also may include a plurality of first touch electrodes, a plurality of second touch electrodes, a plurality of first touch electrode lines RL, a plurality of second touch electrode lines, a plurality of first connecting parts BR, a plurality of second connecting parts BT and an auxiliary insulating layer AIL, the first touch electrode also may include a plurality of first touch electrode blocks RX, the second touch electrode also may include a plurality of second touch electrode blocks, and the first touch electrode line RL also may be arranged in the touch area at least partially.

Unlike the embodiment shown in FIG. 2, the present embodiment further defines the encapsulating types of the touch panel.

In one embodiment, as shown in FIG. 9, the touch panel is a touch display panel after thin film encapsulation, and a encapsulating material is a composite encapsulating thin film TFE consisting of an organic film and an inorganic film and having a multilayer structure.

In the present embodiment, the encapsulating mode of the touch display panel is set as thin film encapsulation to ensure that the touch display panel may be made lighter and thinner and an encapsulation layer (i.e., the composite encapsulating thin film TFE) may have good scalability, so that the touch panel still keeps good airtightness when subjected to bending deformation (e.g., a flexible panel).

When the touch panel is a flexible panel, the touch panel may include a substrate BS and a light emitting layer OLED arranged on the substrate, and the composite encapsulating thin film TFE covers the light emitting layer OLED and the substrate BS.

Optionally, the substrate is arranged on the composite encapsulating thin film TFE, or the composite encapsulating thin film TFE is also used as the substrate. When the composite encapsulating thin film TFE is also used as the substrate, the thickness of the touch panel may be further reduced.

Generally speaking, the composite encapsulating thin film TFE does not cover the substrate BS completely but has a certain width in the edge area of the substrate BS, for example, ½ width of the frame area. In this case, when the first touch electrode line RL is arranged in the frame area on the two sides of the touch panel, the frame area capable of being used for wiring is only a part, for example, ½, of the actual frame area, and in order to arrange the first touch electrode line RL in the frame area, it is necessary to further increase the area of the frame area.

However, in the present embodiment, since the first touch electrode line RL does not need to be arranged in the frame area, the advantages of a narrow frame will become more apparent when the present embodiment is applied to the touch display panel utilizing thin film encapsulation.

In the above embodiments, the first touch electrode (e.g., the first touch electrode RE) and the second touch electrode (e.g., the second touch electrode TE) may be in different conductor layers or in an identical conductor layer.

Optionally, the first touch electrode and the second touch electrode may be in an identical conductor layer and formed in an identical patterning process. In this way, the preparation process is simplified, and the thickness of the touch panel is reduced.

In addition, the positions and directions of the first touch electrode and the second touch electrode may be interchanged, which is not defined here in the present application.

The present application further discloses a manufacturing method of the touch panel, which is used for manufacturing the touch panels in the above embodiments.

Figure 10A:
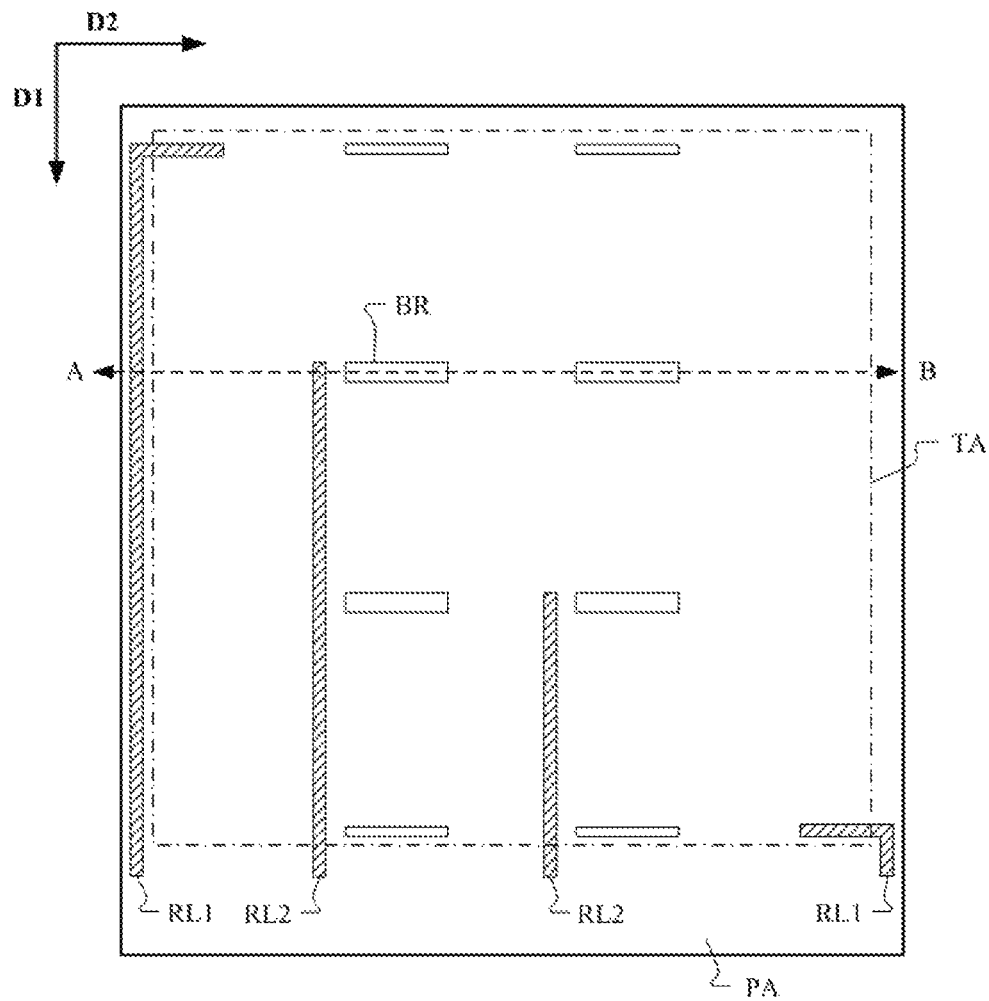
FIG. 10A-FIG. 10C show a top view of part of a preparation process of the touch panel in one embodiment of the present application.
Figure 10B:
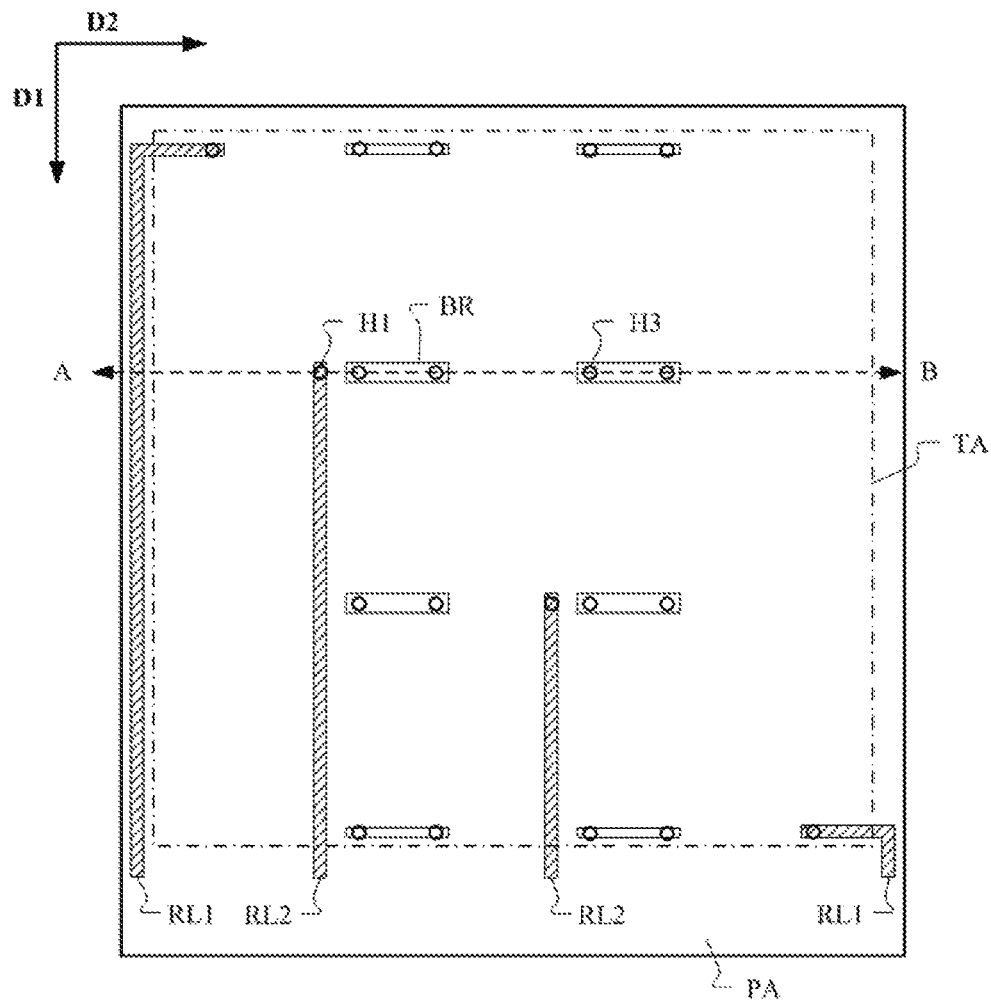
Figure 10C:
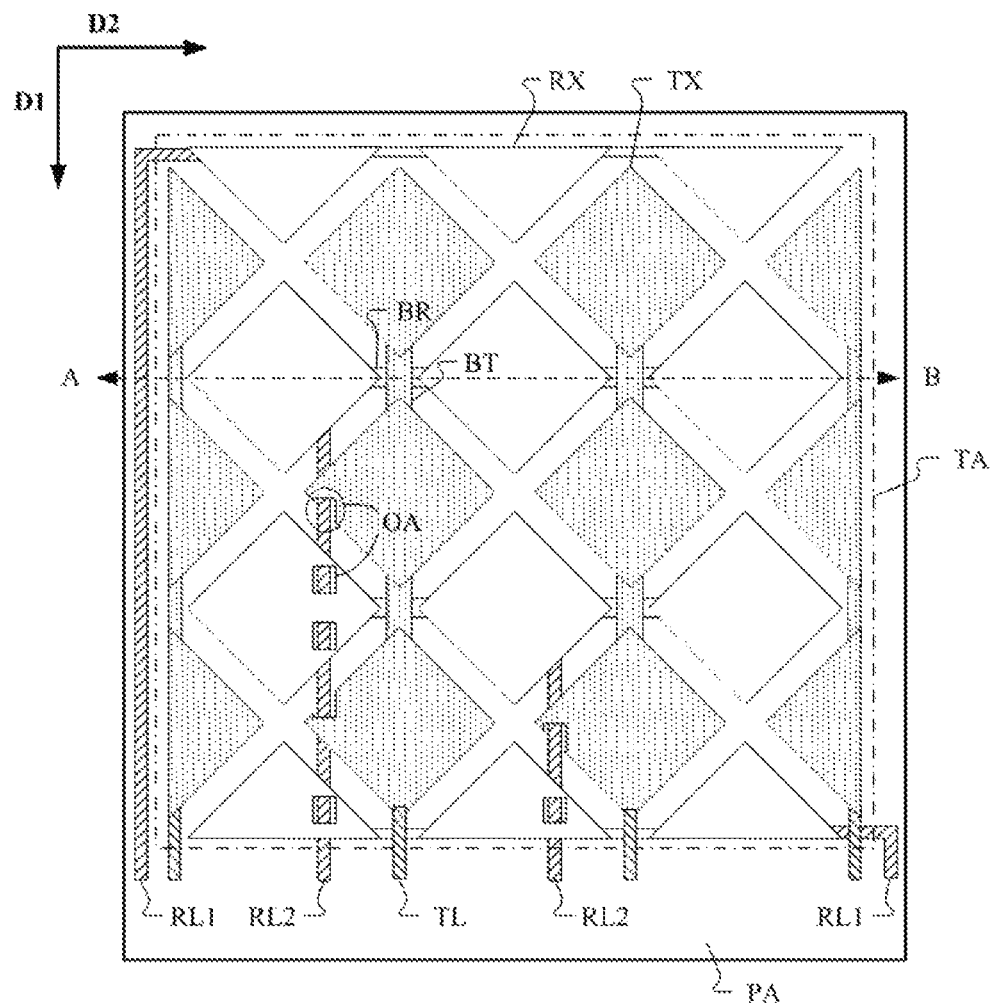
Figure 11A:
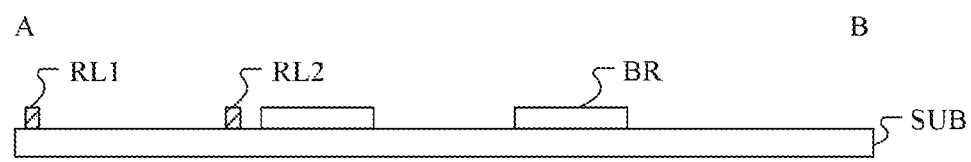
FIG. 11A-FIG. 11C show a sectional view cut along a line AB in FIG. 10A-FIG. 10C respectively.
Figure 11B:
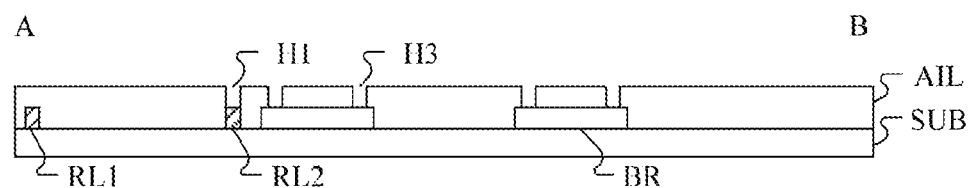
Figure 11C:
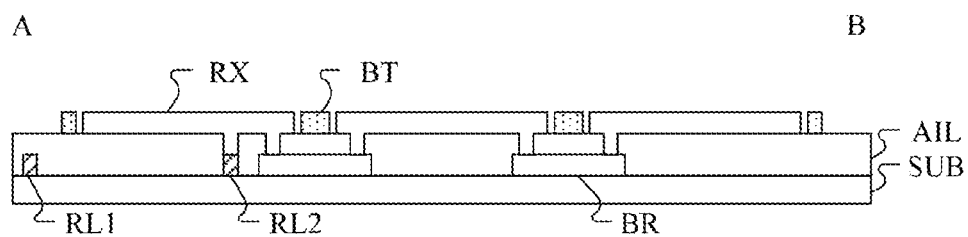

FIG. 10A-FIG. 10C show a top view of part of the preparation process of the touch panel in one embodiment of the present application, and FIG. 11A-FIG. 11C respectively show a diagram of a cross section cut along a line AB shown in FIG. 10A-FIG. 10C.

In the present embodiment, the manufacturing method of the touch panel may include:

Firstly, as shown in FIG. 10A and FIG. 11A, a plurality of first connecting parts BR extending in the second direction D2 are formed in the touch area TA of the substrate SUB, and meanwhile, at least one first touch electrode line RL2 extending from the touch area TA to the peripheral area PA in the first direction D1 is formed.

When the touch panel further includes the first touch electrode line RL1 arranged in the frame area on the two sides, the first touch electrode line RL1 is formed in the frame area on the two sides while the first touch electrode line RL2 is formed.

Secondly, as shown in FIG. 10B and FIG. 11B, the substrate SUB, the first connecting part BR and the first touch electrode line RL2 (and the first touch electrode line RL1) are covered to form the auxiliary insulating layer AIL, and the first contact hole H1 for exposing one end of the first touch electrode line RL2 (and the first touch electrode line RL1) and the third contact hole H3 for exposing the two ends of the first connecting part BR are formed in the auxiliary insulating layer AIL.

Finally, as shown in FIG. 10C and FIG. 11C, a plurality of first touch electrodes arranged in the first direction D1, a plurality of second touch electrodes arranged in the second direction D2, a plurality of second connecting parts extending in the first direction D1 and a plurality of second touch electrode lines TL are formed on the auxiliary insulating layer AIL, and at least one first opening OA is formed in the first touch electrode and/or the second touch electrode to ensure that the orthographic projection of the first touch electrode line RL2 to the substrate SUB overlaps with that of the first opening OA to the substrate SUB.

The first touch electrode includes a plurality of first touch electrode blocks RX arranged in the second direction D2, the second touch electrode includes a plurality of second touch electrode blocks TX arranged in the first direction D1, the first connecting part BR is used for electrically connecting the first touch electrode blocks RX in the first touch electrode through the third contact hole H3, the second connecting part BT is electrically connected with the second touch electrode blocks TX in the second touch electrode, the first touch electrode line RL1/RL2 is electrically connected with the first touch electrode block RX through the first contact hole H1, and the second touch electrode line TL is electrically connected with the second touch electrode block TX.

According to the touch panel formed by the above process, the first touch electrode line RL2 is formed in the area between adjacent two second connecting parts BT in the second direction D2, so that the frame area on the two sides of the touch panel is reduced; and the first opening OA is formed in the area where the first touch electrode line RL2 overlaps with the first touch electrode block RX and/or the second touch electrode block TX, so that the parasitic capacitance between the first touch electrode line RL2 and the first touch electrode block RX and/or the second touch electrode block TX is reduced.

Figure 12A:
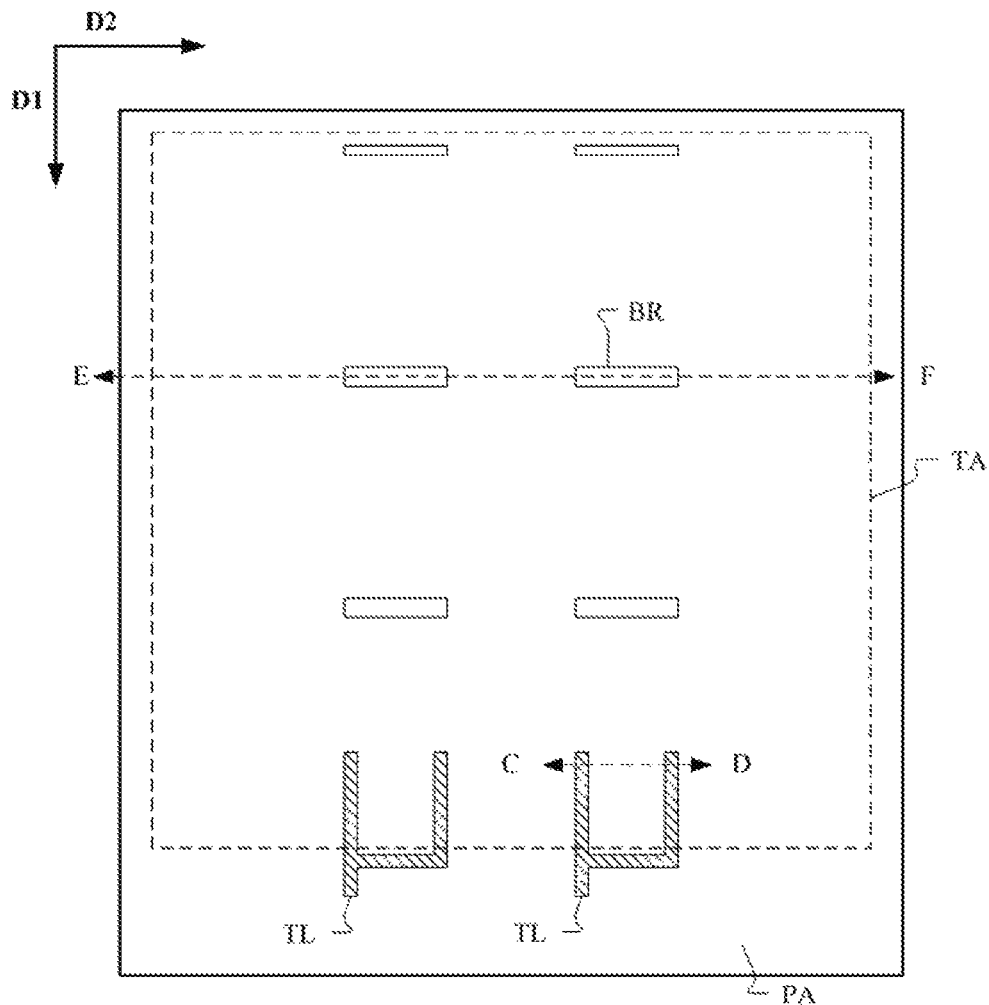
FIG. 12A-FIG. 12C show a top view of part of the preparation process of the touch panel in another embodiment of the present application.
Figure 12B:
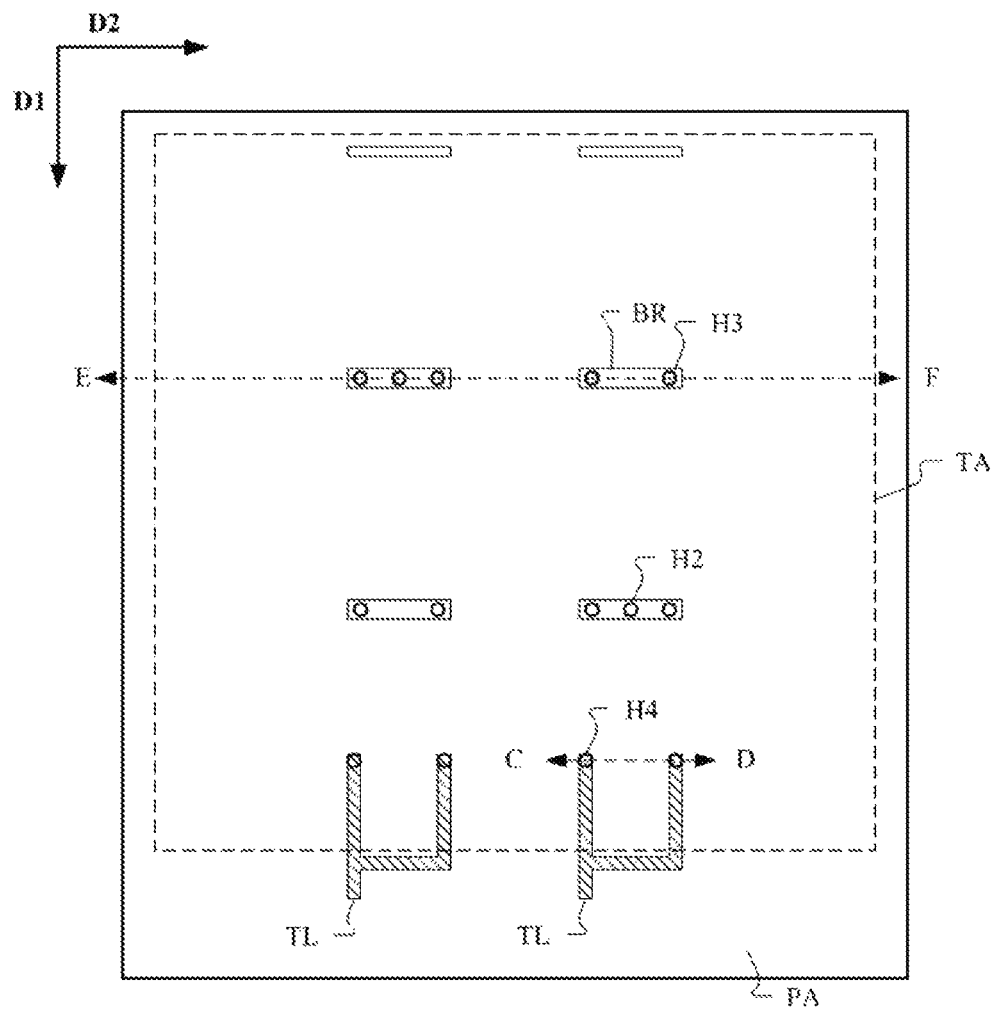
Figure 12C:
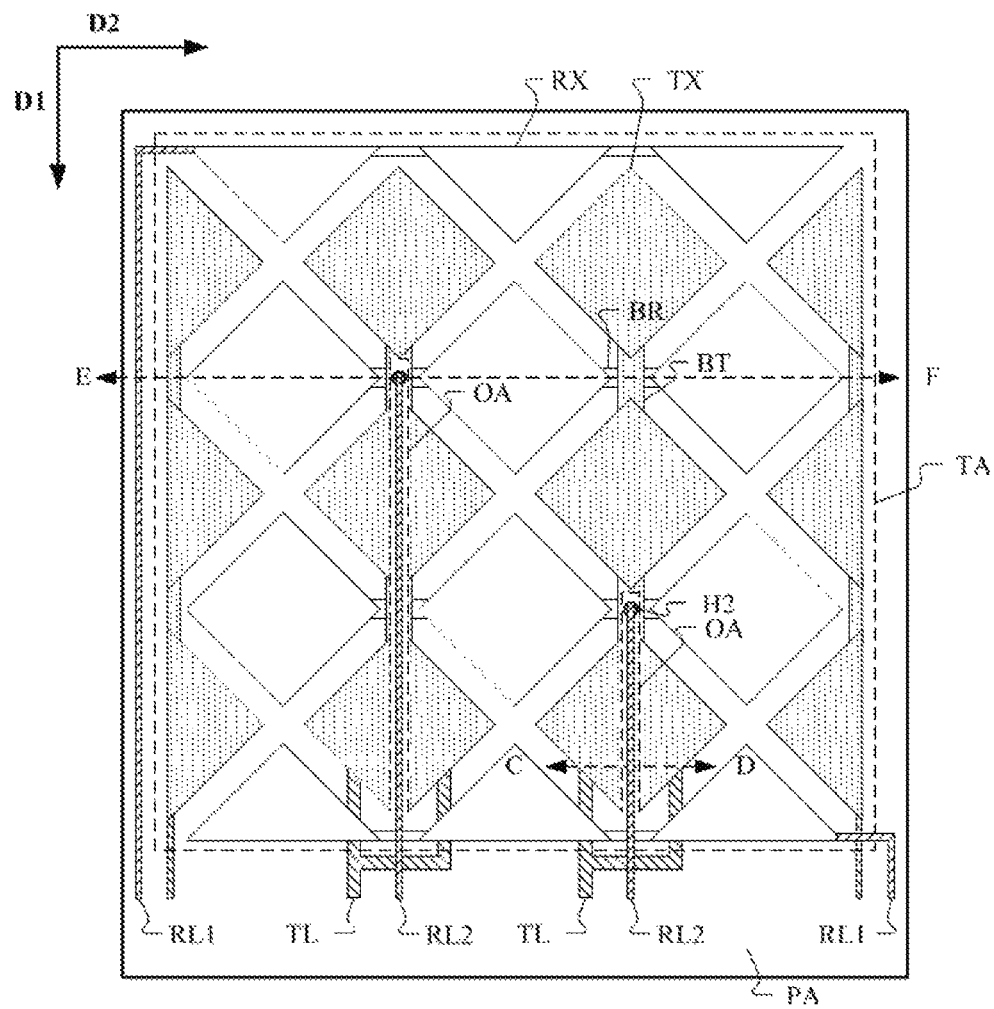
Figure 13A:
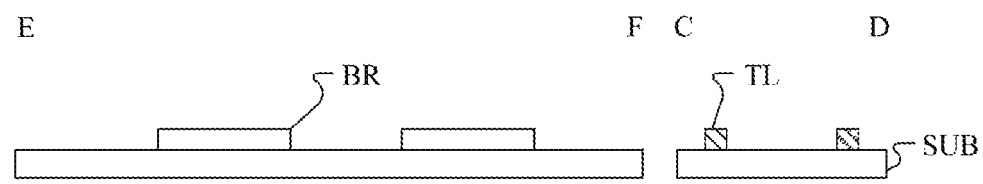
FIG. 13A-FIG. 13C show a sectional view cut along a line CD and a line EF in FIG. 12A-FIG. 12C respectively.
Figure 13B:
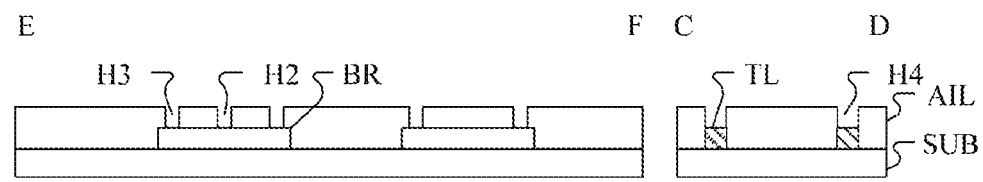
Figure 13C:
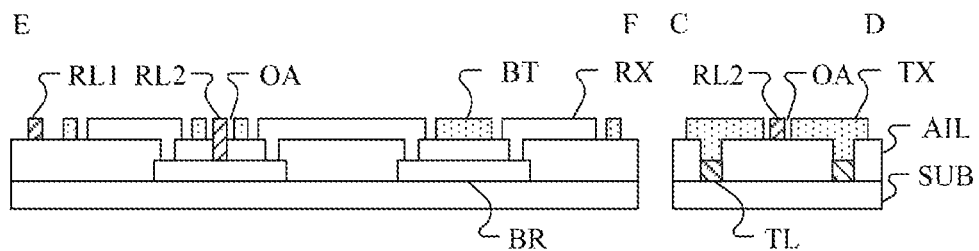

Continue to refer to FIG. 12A-FIG. 12C and FIG. 13A-FIG. 13C, FIG. 12A-FIG. 12C show a top view of part of the preparation process of the touch panel in another embodiment of the present application, and FIG. 13A-FIG. 13C respectively show a diagram of a cross section cut along a line CD and a line EF shown in FIG. 12A-FIG. 12C.

In the present embodiment, the manufacturing method of the touch panel may include:

Firstly, as shown in FIG. 12A and FIG. 13A, a plurality of first connecting parts BR extending in the second direction D2 are formed in the touch area TA of the substrate SUB, and meanwhile, a plurality of second touch electrode lines RL are formed, the second touch electrode line TL has two arranged wires which are parallel in the touch area TA and are electrically connected with each other in the peripheral area PA.

Secondly, as shown in FIG. 12B and FIG. 13B, the substrate SUB and the second touch electrode line RL are covered to form the auxiliary insulating layer AIL, and the fourth contact hole H4 for exposing the two arranged wires of the second touch electrode line RL, the third contact hole H3 for exposing the two ends of the first connecting part BR and the second contact hole H2 for exposing the first connecting part BR are formed in the auxiliary insulating layer AIL.

Finally, as shown in FIG. 12C and FIG. 13C, a plurality of first touch electrodes arranged in the first direction D1, a plurality of second touch electrodes arranged in the second direction D2, a plurality of second connecting parts extending in the first direction D1 and a plurality of first touch electrode lines RL1/RL2 are formed on the auxiliary insulating layer AIL, and the line openings OA are formed in the second touch electrode and the second connecting part BT to ensure that the first touch electrode line RL2 is in the line opening OA.

The first touch electrode includes a plurality of first touch electrode blocks RX arranged in the second direction D2, the second touch electrode includes a plurality of second touch electrode blocks TX arranged in the first direction D1, the first connecting part BR is used for electrically connecting the first touch electrode blocks RX in the first touch electrode through the third contact hole H3, the second connecting part BT is electrically connected with the second touch electrode blocks TX in the second touch electrode, the first touch electrode line RL1 is electrically connected with the first touch electrode block RX directly, the first touch electrode line RL2 is electrically connected with the first connecting part through the second contact hole H2, and the second touch electrode line TL is electrically connected with the two parts, separated by the line opening OA, of the second touch electrode block TX through the fourth contact hole H4.

According to the touch panel formed by the above process, the line opening OA is formed in the second touch electrode, and the first touch electrode line RL2 is formed in the line opening OA, thereby reducing the frame area on the two sides of the touch panel.

It should be understood by those skilled in the art that, in the manufacturing process of the touch panel, in addition to the process steps disclosed by the above embodiment, some known process steps may also be included, and in order not to obscure the core process steps of the above embodiment, the description of these known process steps is omitted when the manufacturing method of the touch panel in the above embodiment is described.

Figure 14:
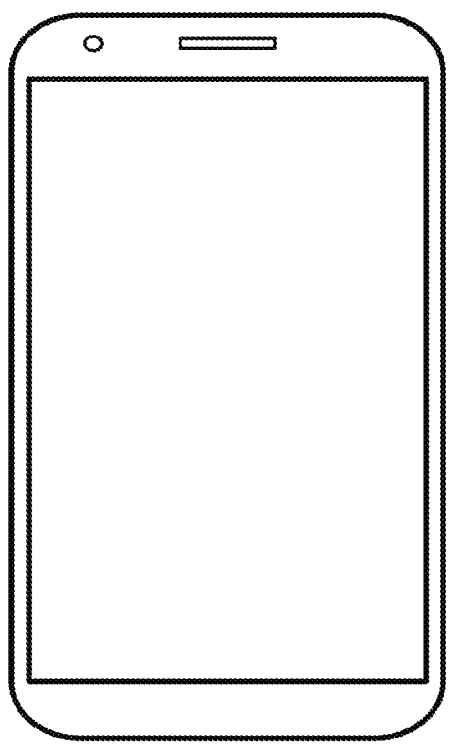
FIG. 14 shows a schematic structure diagram of an embodiment of the display device of the present application.

The present application further discloses a display device, as shown in FIG. 14. In one embodiment, the display device 1400 may include the touch panel described above. It should be understood by those skilled in the art that the display device may further include some other known structures, for example, a thin-film transistor and the like, in addition to the touch panel described above. In order not to obscure the focus of the present application, these known structures will no longer be further described.

The display device of the present application may be any device containing the touch panel described above, including but not limited to, as shown in FIG. 14, a cellular mobile phone 1400, a tablet computer, a computer display, a display applied to a smart wearable device, a display device applied to means of transportation, such as an automobile, and the like. As long as a display device contains the structure of the touch panel disclosed by the present application, it is deemed to fall within the scope of protection of the present application.

According to the touch panel and the display device provided by the present application, by setting the opening area in the first touch electrode and/or the second touch electrode, and setting the first touch electrode line in the touch area at least partially, a frame area on two sides of the touch panel is reduced to facilitate implementation of a narrow frame; meanwhile, the orthographic projection of the first touch electrode line to the substrate overlaps with that of the opening area to the substrate, so that the parasitic capacitance between the first touch electrode line and the first touch electrode and/or the second touch electrode is reduced.

The above description only provides an explanation of embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A touch panel, comprising:
   a substrate, comprising a touch area and a peripheral area outside the touch area, wherein the touch area is provided with a plurality of first touch electrodes arranged in a first direction and a plurality of second touch electrodes arranged in a second direction, a first touch electrode of the plurality of first touch electrodes comprises a plurality of first touch electrode blocks arranged in the second direction, a second touch electrode of the plurality of second touch electrodes comprises a plurality of second touch electrode blocks arranged in the first direction, and the first direction intersects the second direction;
   a plurality of first touch electrode lines and a plurality of second touch electrode lines, wherein a first touch electrode line of the plurality of first touch electrode lines is configured to transmit a first touch signal to the first touch electrode, a second touch electrode line of the plurality of second touch electrode lines is configured to transmit a second touch signal to the second touch electrode, and the first touch electrode lines are at least partially arranged in the touch area; and
   a plurality of first connecting parts, a plurality of second connecting parts, and an auxiliary insulating layer between the first connecting parts and the second connecting parts,
   wherein:
   the first touch electrode and the second touch electrode have an opening area; and
   an orthographic projection of the first touch electrode line to the substrate overlaps with an orthographic projection of the opening area to the substrate,
   the first touch electrode blocks in the first touch electrode are electrically connected with each other through the first connecting parts, and the second touch electrode blocks in the second touch electrode are electrically connected with each other through the second connecting parts;
   the second connecting parts and the second touch electrode blocks are in an identical conductor layer,
   the second touch electrode block and the first touch electrode line are in an identical conductor layer and are insulated from each other;
   the touch panel further comprises a plurality of line openings extending in the first direction in the second touch electrode, and the first touch electrode line is arranged in the line opening; and
   the auxiliary insulating layer is provided with a second contact hole, and the first touch electrode line is electrically connected with the first connecting part through the second contact hole.

2. The touch panel according to claim 1, wherein the second touch electrode lines and the second touch electrode blocks are in an identical conductor layer, and the first touch electrode lines and the first connecting parts are in an identical conductor layer and are separated from each other;
   the first touch electrode block and the second touch electrode block have at least one first opening; and
   an orthographic projection of the first touch electrode line to the substrate overlaps with an orthographic projection of at least one first opening to the substrate.

3. The touch panel according to claim 2, wherein the auxiliary insulating layer is provided with a first contact hole, and the first touch electrode line is electrically connected with the first touch electrode block through the first contact hole.

4. The touch panel according to claim 2, further comprising a connecting electrode in an identical layer with the first connecting part, wherein the first touch electrode line is electrically connected with the first connecting part through the connecting electrode.

5. The touch panel according to claim 1, wherein two parts of the second touch electrode block separated by the line opening are electrically connected to an identical second touch electrode line.

6. The touch panel according to claim 1, wherein the first touch electrode block and the second touch electrode block are in an identical conductor layer and are formed in an identical patterning process.

7. A display device, comprising a touch panel, wherein the touch panel comprises:
- a substrate, comprising a touch area and a peripheral area outside the touch area, wherein the touch area is provided with a plurality of first touch electrodes arranged in a first direction and a plurality of second touch electrodes arranged in a second direction, a first touch electrode of the plurality of first touch electrodes comprises a plurality of first touch electrode blocks arranged in the second direction, a second touch electrode of the plurality of second touch electrodes comprises a plurality of second touch electrode blocks arranged in the first direction, and the first direction intersects the second direction;
- a plurality of first touch electrode lines and a plurality of second touch electrode lines, wherein a first touch electrode line of the plurality of first touch electrode lines is configured to transmit a first touch signal to the first touch electrode, a second touch electrode line of the plurality of second touch electrode lines is configured to transmit a second touch signal to the second touch electrode, and the first touch electrode lines are at least partially arranged in the touch area; and
- a plurality of first connecting parts, a plurality of second connecting parts, and an auxiliary insulating layer between the first connecting parts and the second connecting parts, wherein:
- the first touch electrode and/or the second touch electrode has an opening area; and
- an orthographic projection of the first touch electrode line to the substrate overlaps with an orthographic projection of the opening area to the substrate,
- the first touch electrode blocks in the first touch electrode are electrically connected with each other through the first connecting parts, and the second touch electrode blocks in the second touch electrode are electrically connected with each other through the second connecting parts;
- the second connecting parts and the second touch electrode blocks are in an identical conductor layer,
- the second touch electrode block and the first touch electrode line are in an identical conductor layer and are insulated from each other;
- the touch panel further comprises a plurality of line openings extending in the first direction in the second touch electrode, and the first touch electrode line is arranged in the line opening; and
- the auxiliary insulating layer is provided with a second contact hole, and the first touch electrode line is electrically connected with the first connecting part through the second contact hole.

\* \* \* \* \*